Jan. 8, 1929.  1,697,974
J. G. FUNK
KITCHEN TOOL
Filed Feb. 26, 1927
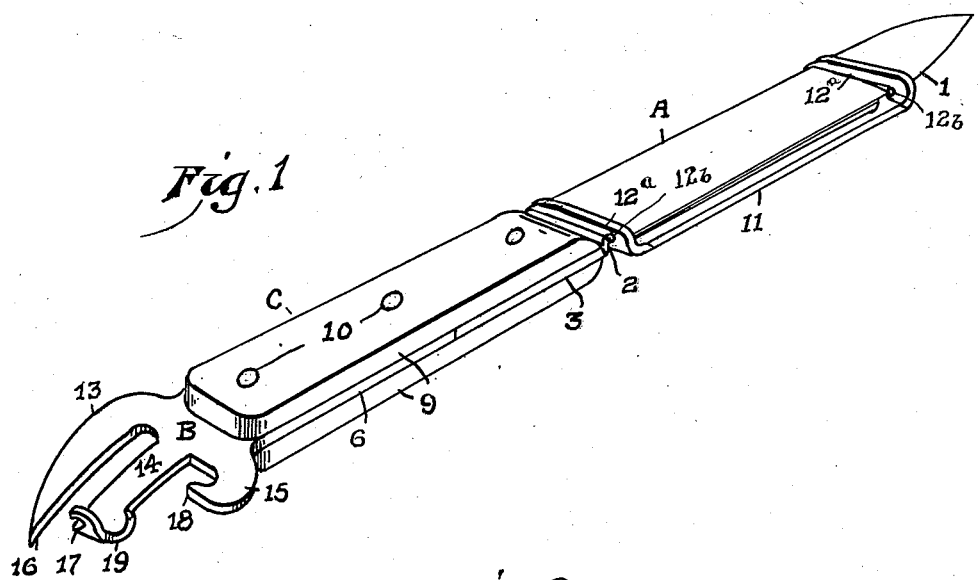
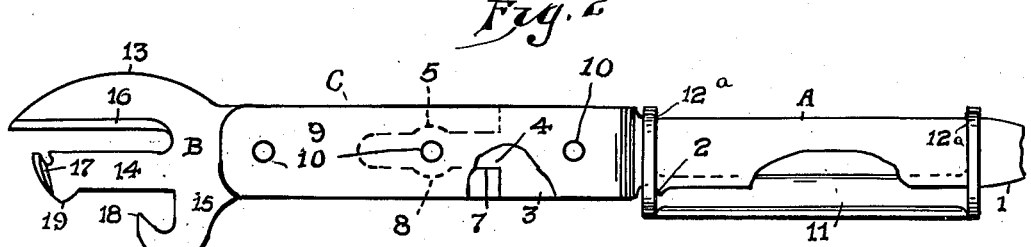
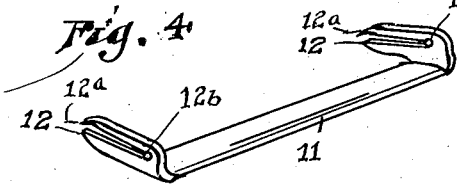
INVENTOR.
John G. Funk,
BY Edward A. Lawrence,
his ATTORNEY.

Patented Jan. 8, 1929.

1,697,974

UNITED STATES PATENT OFFICE.

JOHN G. FUNK, OF CLEVELAND, OHIO.

KITCHEN TOOL.

Application filed February 26, 1927. Serial No. 171,300.

One of the objects which I have in view is the provision of a multiple purpose kitchen tool in which are combined a paring knife and a can opener or a bottle opener, or both of the same.

Another object which I have in view is the provision of a new and improved guarded paring knife.

Another object which I have in view is the provision of a new and improved can opener.

Another object which I have in view is the provision of a new and improved bottle opener.

Another object which I have in view is a new and improved combination can opener and bottle opener.

Other objects will appear from the following description.

For the accomplishment of the objects in view, I have invented the new and improved tool substantially as hereinafter described.

In the accompanying drawings, wherein I have illustrated the best embodiment of the principles of my invention now known to me, Fig. 1 is a perspective of the combination kitchen tool; Fig. 2 is a side view of the same, partially broken away in section to show parts; Fig. 3 is an edge view looking upwardly in Fig. 2; and Fig. 4 is a perspective of the knife guard dismounted from the knife.

Referring to the drawings, A is a knife member made of suitable steel and having as one of its lateral edges the knife edge 1. At its inner end the knife edge is recessed as at 2 to form a seat. 3 is the flat tang of the knife member, the end of the same being provided with a narrow tongue 4 having an intermediate enlargement or boss 5 with curved sides.

B is the can-opener and bottle-opener member, also made of steel and having a flat tang 6 whose inner end is provided with a longitudinally disposed slotted opening 7 in which the tongue 4 of the tang 3 fits, and also provided with a recess 8 intermediate of the slot 7 in which the boss 5 of the tongue 4 fits. Thus the two tangs 3 and 6 interlock to prevent separation, and they are held in their interlocked relation by means of the handle C which comprises a pair of wooden or other plates 9 which fit against either side of the tangs and are clamped snugly thereto as by rivets 10 which extend through the handle plates 9 and the tangs 3 and 6.

Thus steel of different character or cost may be used for the two members A and B and said members are held in permanent and rigid relationship to form a unitary multiple-purpose tool.

The knife is provided with a guard to determine the thickness of the peel and to prevent cutting the hands of the user. Thus 11 is a flat steel plate disposed in parallelism with and spaced from the knife edge 1 by means of the pairs of spring legs 12 and 12$^a$ extending at right angles at each end of the plate 11, said legs straddling and gripping the knife. The legs 12$^a$ are provided with slightly prolonged and inturned ends so that when the knife blade is forced between the legs, the ends of the legs 12$^a$ spring into place at the rear of the knife blade and prevent the dislodgment of the guard from the blade.

The juncture of the legs is provided with a socket in which a block or piece of copper or other soft metal 12$^b$ is seated to prevent dulling or nicking of the blade. The bridge between the inner pair of legs 12 and 12$^a$ is pressed down into the seat 2, thus preventing accidental movement of the guard longitudinally of the blade. The spring grip of the legs on the knife serves to hold the guard in place. It is apparent that the guard is reversible on the blade so that the plate 11 may be positioned at either side of the knife edge to suit either a right-handed or a left-handed worker.

The protruding end of the member B is provided with three integral fingers 13, 14, and 15, finger 14 being intermediate of the others. The finger 13 is pointed at its outer end to punch through the top of a tin can, its outer edge being preferably curved while its inner edge is straight and beveled to form a cutting edge 16. The finger 14 is provided at its outer end with a laterally extended prong 17 which is notched on its side next the finger 13 and is intended to ride on the top edge of the can to be opened and guide the line of cut. The fingers 13 and 14 are curved slightly in the opposite direction of the prong 17, thus causing the can opener to move in an arcuate instead of a straight path in cutting through the top of a can.

This curvature has been found to be of the greatest advantage as without this provision the cut would tend to progress in a straight line and the tool would require a twisting movement to maintain the necessary curvature in the cut to follow a circular or oval can top.

The finger 15 is curved inwardly toward the finger 14 and has its end provided with a sharp spur 18 which may be inserted under the crimped edge of the metal cap of a bottle while the finger 14 is rested on the top of the cap. The finger 14 is provided at its outer end with a spur 19 which bears on the top of the cap.

It is evident from the foregoing that my improved tool combines in one implement the functions of a paring knife, can opener, and bottle opener, and that each of these functions is accomplished in an improved manner owing to the novel structural features above described.

The combination of means for accomplishing the various purposes in view in one and the same tool lends to economy and convenience, neither means interfering in any manner with the use of the other means.

What I desire to claim is:—

1. A kitchen tool comprising a pair of tool elements placed in alinement and having their tangs interlocked, a pair of handle plates placed against the opposite sides of the tangs and bridging the joint thereof, and clamping members extending through the plates and said tanks to hold the parts permanently in fixed relation.

2. A paring knife having a knife edge along one side thereof, a guard for said knife edge comprising a plate arranged in parallelism with and spaced from the knife edge, and pairs of spring gripping fingers at either end of said plate arranged to straddle the blade, the knife edge being notched to form a seat to receive the bridge between one pair of fingers to prevent movement of the guard longitudinally of the knife.

3. A guard for a paring knife comprising a guard-plate disposed in parallel and spaced relation to the cutting edge of the knife, and a pair of spring legs at each end of the guard-plate adapted to receive the knife between them, one of each of said pairs having an inturned end which engages the rear edge of the blade and prevents accidental dislodgment of the guard from the blade.

4. A guard for a paring knife comprising a guard-plate disposed in parallel and spaced relation to the cutting edge of the knife, and a pair of spring legs at each end of the guard-plate adapted to receive the knife between them, one of each of said pairs having an inturned end which engages the rear edge of the blade and prevents accidental dislodgment of the guard from the blade, and an impact-block of soft metal at the juncture of the legs to prevent injury to the cutting edge.

JOHN G. FUNK.